UNITED STATES PATENT OFFICE.

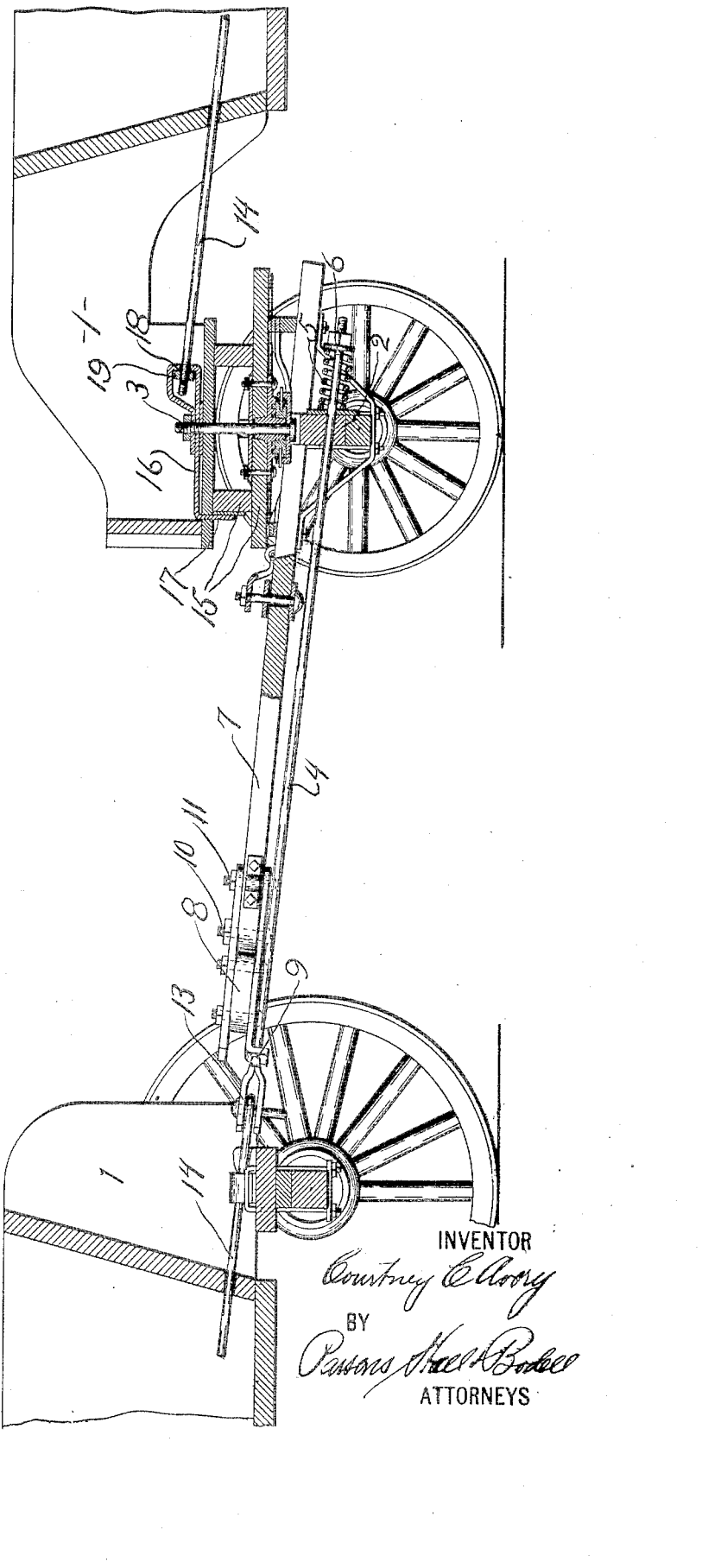

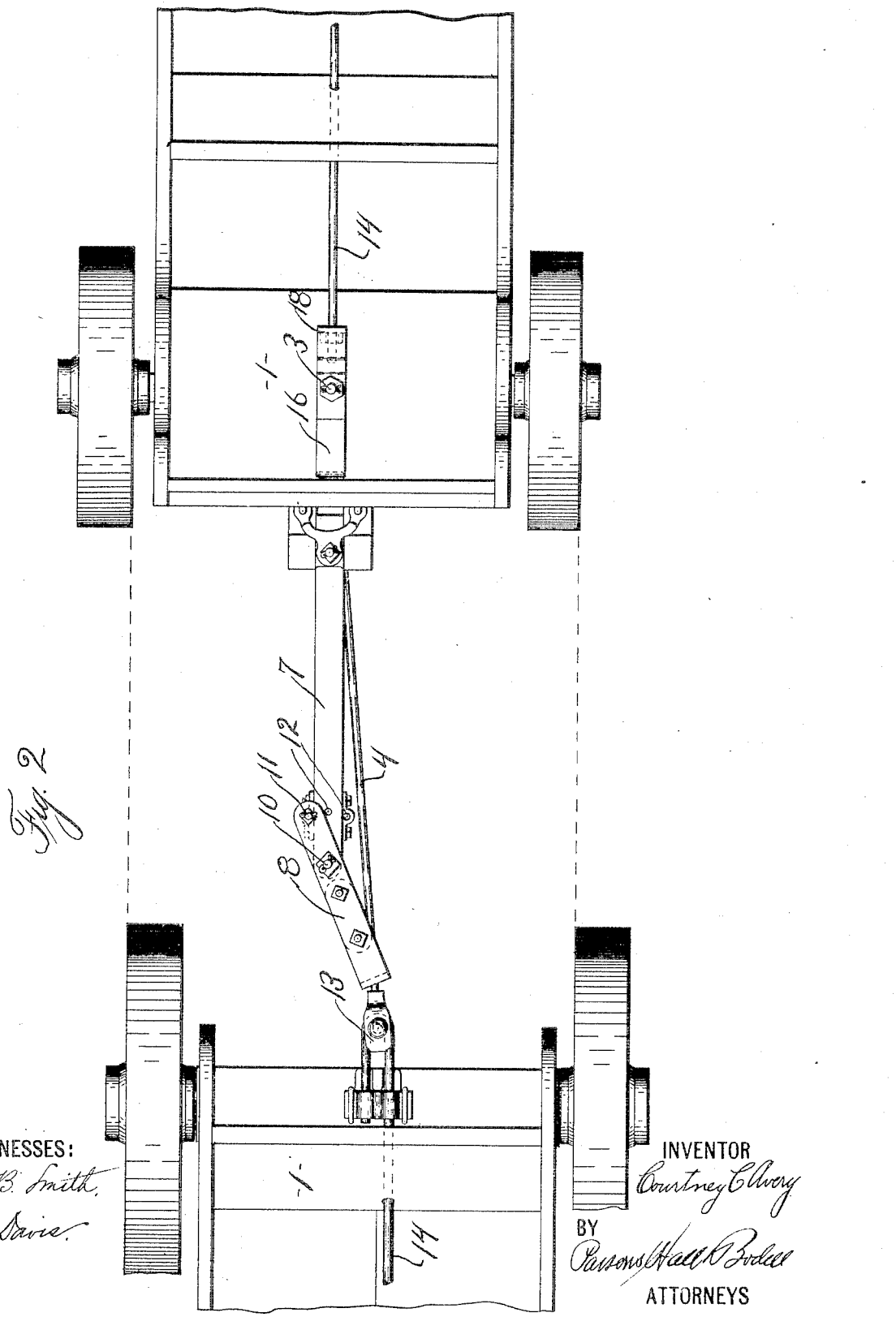

COURTNEY C. AVERY, OF AUBURN, NEW YORK, ASSIGNOR TO THE EAGLE WAGON WORKS, OF AUBURN, NEW YORK, A CORPORATION OF NEW YORK.

WAGON-TRAIN COUPLING.

1,116,533.  Specification of Letters Patent.  Patented Nov. 10, 1914.

Application filed March 20, 1912. Serial No. 684,956.

*To all whom it may concern:*

Be it known that I, COURTNEY C. AVERY, of Auburn, in the county of Cayuga and State of New York, have invented a certain new and useful Wagon-Train Coupling, of which the following is a specification.

This invention relates to wagon trains and has for its object means for coupling the wagons together, whereby the wagons can be hitched, if desired, to travel in different tracks to avoid wearing ruts in the road. Other objects will appear throughout the specification.

The invention consists in the combinations and constructions hereinafter set forth and claimed.

In describing this invention reference is had to the accompanying drawings in which like characters designate corresponding parts in all the views.

Figure 1 is a longitudinal sectional view, parts being removed, of two dump wagons provided with my invention. Fig. 2 is a plan of parts seen in Fig. 1.

1, 1 are wagons, each of which is provided with a front axle 2, which turns in the usual manner about the axis of a king bolt 3.

4 is a traction member connected to the rear end of one wagon and to the front axle 2 of the trailing wagon, said member 4 being here shown in the form of a rigid rod connected substantially centrally of the axle 2 and being here shown as extending through the front axle to the rear thereof and as arranged to transmit its drawing force to the front axle through yielding means as a spring 5 interposed between the rear face of the axle and the shoulder 6 on the rear end of the rod 4. The rod 4 is free to swing laterally relatively to the axle and is therefore pivotally connected thereto.

7 is a steering member connected to the front axle to turn the same, this steering member being here shown as a stub pole connected to the axle 2 to turn the same, and 8 is an element rigidly and adjustably connected to the pole and to the traction member 4 to determine the line of draft of the trailing wagon relatively to that of the preceding wagon. Said element 8 may be of any desirable form, size and construction and is here shown as having an eye 9 for slidably receiving the rod 4, and with means as pins or bolts 10, 11 for engaging the pole 7, the pin 10 extending through a hole at the front end of the pole 7 and the pin 11 being designed to extend through any one of a plurality of holes 12 arranged transversely of the pole 7, the element 8 being movable about the pin 10 in order to position the element 8 so that the pin 11 can be inserted through a predetermined hole 12.

The adjustment of the element 8 relatively to the tongue or pole 7 determines the angular relation of the pole and traction member 4, and obviously when the bolt 11 is in the central hole 12, the members 4 and 7 will be in parallelism and the wagons will travel in the same path, and when the pin 11 is in the right hand hole 12, as shown in Fig. 2, the pole and traction member will be thrown out of parallelism and the wagon will trail slightly to the right of the preceding wagon so that the wheels will not travel in the same track. The adjustment of the element 8 so that the pin 11 is in the left hand hole 12, will cause the line of draft of the rear wagon to pass to the left of the line of draft of the preceding wagon and hence the wheels thereof to travel to the left of the tracks of the preceding wagon.

In the illustrated embodiment of my invention, the traction member is not connected directly to the preceding wagon but is connected to means as a clevis 13 to the rear end of a member or rod 14 extending lengthwise of the wagon body and connected at its front end to the front bolster 15, said rod 14 being here shown as connected to a plate 16 having a perforation for the king bolt 3, and a shoulder 17 for interlocking with the front bolster so that both the king bolt and the bolster receive the pulling strain of the rod 14.

The rod 14 extends through a perforation in a vertically disposed lug 18 of the plate 16 and is connected thereto by means of a nut 19 screwing on the rod against the part 18. This lug is formed by looping a portion of the plate back upon itself in such position that the end of the looped portion overlies the plate and is pierced by the king bolt. By reason of the connection 14, the bodies and frames of the wagons are relieved of all pulling strain.

My invention is particularly advantageous in that it can be readily applied to existing forms of wagons, and can be readily adjusted to position the wagons so that the wagons of the train will not all travel in the same track.

What I claim is:

1. In a wagon train coupling and in combination, a rigid traction member extending between the rear end of one vehicle and the front end of the following vehicle and pivotally connected to said vehicles, a stub pole having a fixed relation to the axle of the following vehicle and extending forwardly therefrom, a member pivotally connected intermediate of its length to the end of the stub pole and connected at its front end to the traction member, and means for connecting the rear end thereof to the pole at one of a plurality of points, substantially as and for the purpose described.

2. In a wagon train coupling and in combination, a rigid traction member extending between the rear end of one vehicle and the front end of the following vehicle and pivotally connected to said vehicles, a stub pole having a fixed relation to the axle of the following vehicle and extending forwardly therefrom, a member pivotally connected intermediate of its length to the end of the stub pole and connected at its front end to the traction member, and means for connecting the rear end thereof to the pole at one of a plurality of points, one of said points being located substantially in the plane of the longer axis of the stub pole, and other of said points being located on opposite sides of said plane, substantially as and for the purpose specified.

3. The combination with two wagons arranged tandem, of a rigid rod extending through the front axle of the rear wagon and movable laterally in relation thereto, a spring interposed between said axle and the rear end of said rod, a connection between the front end of the rod and the front wagon, a steering member extending from the front axle of the rear wagon, and an element having a pivotal connection at its front end to said rod, a pivotal connection intermediate of its length to the end of the steering member substantially in the plane of the longer axis thereof, and a detachable connection to one of a plurality of portions of the steering member, substantially as and for the purpose set forth.

4. The combination with two wagons arranged tandem, of a rigid rod extending through the front axle of the rear wagon and movable laterally in relation thereto, a spring interposed between said axle and the rear end of said rod, a connection between the front end of the rod and the front wagon, a steering member extending from the front axle of the rear wagon, and an element having a pivotal connection at its front end to said rod, a pivotal connection intermediate of its length to the end of the steering member substantially in the place of the longer axis thereof, and a detachable connection to one of a plurality of portions of the steering member, said portions being arranged substantially in, and to one side of, the longer axis of the steering member, substantially as and for the purpose described.

5. The combination with two wagons arranged tandem, of coupling means therebetween comprising, a rigid rod extending through the front wagon from front to rear and having a loop at its rear end and means at its front end for engaging a part for preventing lengthwise movement of the rod, a second rigid rod engaging at its front end the loop of the first-named rod and having its rear end extending through an opening in the front axle of the rear wagon, a spring interposed between said axle and the rear end of the second rod, a steering member extending forwardly from the front axle of the rear wagon, a member pivotally connected intermediate of its length to the steering member and having at its front end a pivotal connection to the second rod, and means for connecting the rear end of said member to the steering member at one of a plurality of points, substantially as and for the purpose specified.

6. In combination, two wagons arranged tandem, a plate associated with the front wagon and having an opening to receive the king bolt thereof, a shoulder for engaging the front face of the front bolster, and a vertically disposed lug, a rigid rod extending lengthwise of the front wagon and having its front end extending through said lug and surmounted by a nut and its rear end bent to form a loop, a second rigid rod having a pin at its front end passing through said loop and having its rear end movably connected to the front portion of the rear wagon, a steering member extending forwardly from the front axle of the rear wagon, an element pivotally connected intermediate of its length to the steering member and having a pivotal connection at its front end to the second rod, and means for connecting the rear end of said element to the steering member at one of a plurality of points, substantially as and for the purpose set forth.

7. The combination with two wagons arranged tandem, of a rigid rod extending between the wagons, and pivotally connected at its opposite ends to the same, a stub pole extending forwardly from the front axle of the rear wagon, a connecting member comprising upper and lower plates rigidly attached to each other, said plates embracing upper and lower faces of the front end of said pole, a pivotal connection between the intermediate portion of the plates and the said pole, and means for detachably connecting the rear end of the plates to one of a plurality of parts of the pole, one of said plates being provided with a laterally extending portion having an eye therein through which said rod extends, substantially as and for the purpose described.

In testimony whereof, I have hereunto signed my name in the presence of two attesting witnesses, at Auburn, in the county of Cayuga, in the State of New York, this 27th day of February 1912.

COURTNEY C. AVERY.

Witnesses:
J. B. SMITH,
C. OHLMEYER.